US011387921B2

(12) United States Patent
Endo et al.

(10) Patent No.: US 11,387,921 B2
(45) Date of Patent: Jul. 12, 2022

(54) MOBILE TERMINAL TESTING DEVICE AND MOBILE TERMINAL TESTING METHOD

(71) Applicant: ANRITSU CORPORATION, Kanagawa (JP)

(72) Inventors: Hideyuki Endo, Kanagawa (JP); Hironori Watanabe, Kanagawa (JP); Takumi Nakamura, Kanagawa (JP); Yui Yoshida, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/341,926

(22) Filed: Jun. 8, 2021

(65) Prior Publication Data

US 2021/0399811 A1   Dec. 23, 2021

(30) Foreign Application Priority Data

Jun. 18, 2020   (JP) ............................. JP2020-105007

(51) Int. Cl.
*H04W 24/00* (2009.01)
*H04B 17/10* (2015.01)
*H04B 17/15* (2015.01)
*H04W 24/06* (2009.01)

(52) U.S. Cl.
CPC ........... *H04B 17/102* (2015.01); *H04B 17/15* (2015.01); *H04W 24/06* (2013.01)

(58) Field of Classification Search
CPC ...... H04B 17/102; H04B 17/15; H04W 24/06
USPC .......................................... 375/224; 455/425
See application file for complete search history.

(56) References Cited

U.S. PATENT DOCUMENTS

| 9,377,495 | B2 | 6/2016 | Chien et al. | |
| 2010/0153045 | A1* | 6/2010 | Teshirogi | H04B 17/102 343/703 |
| 2018/0080968 | A1* | 3/2018 | Qi | H04B 17/29 |
| 2018/0172747 | A1* | 6/2018 | Qi | G01R 29/0871 |

OTHER PUBLICATIONS

3GPP TR 38.803 V14.2.0 (Sep. 2017) Technical Specifications (Third Generation Partnership Project (3GPP)) published in Sep. 2017; Chapter 10.2.2.5 OTA Measurements in the Radiative Near Field Column, pp. 159-161.

* cited by examiner

*Primary Examiner* — Don N Vo
(74) *Attorney, Agent, or Firm* — Pearne & Gordon LLP

(57) ABSTRACT

A measuring device 1 includes an integrated control device 10 that performs control to measure a specific measurement item by performing a measurement operation, a predetermined number of times, of transmitting a test signal and receiving a signal under measurement transmitted from a DUT 100 at a measurement position where the DUT 100, which is rotated by a DUT scanning mechanism 56 in an OTA chamber 50, faces a desired orientation; a disconnection detection unit 18*a* that detects disconnection of call connection at the measurement position; a reconnection control unit 18*b* that performs reconnection of the call connection in a case where the disconnection of the call connection is detected; and a measurement return control unit 18*c* that returns to measurement at a subsequent measurement position from a measurement position where the disconnection of the call connection is detected after reconnection.

6 Claims, 9 Drawing Sheets

MOBILE TERMINAL TESTING DEVICE AND MOBILE TERMINAL TESTING METHOD

TECHNICAL FIELD

The present invention relates to a mobile terminal testing device and a mobile terminal testing method for performing a test on a mobile terminal by exchanging signals while changing an angle of a positioner on which the mobile terminal is installed under over the air (OTA) environment.

BACKGROUND ART

For a wireless terminal that is developed in recent years and transmits and receives a radio signal corresponding to IEEE802.11ad, 5G cellular, and the like, in which a wideband signal in a millimeter wave band is used, a performance test is performed for measuring an output level and reception sensitivity of a transmitted radio wave determined for each communication standard with respect to a wireless communication antenna included in the wireless terminal, and determining whether or not a predetermined reference is satisfied.

For example, in a performance test in which a wireless terminal for a 5G new radio (NR) system (hereinafter, referred to as a 5G wireless terminal) is used as a device under test (DUT), an OTA test is performed using a radio anechoic box (OTA chamber) called a compact antenna test range (CATR) which is not affected by a surrounding radio wave environment.

In the OTA test, the DUT and a test antenna are housed in the CATR, transmission of the test signal from the test antenna to the DUT and reception of a signal under measurement transmitted from an antenna of the DUT (hereinafter, an antenna under test), which has received the test signal, are performed by the test antenna through wireless communication, and measurement of a radio signal in a frequency band (target frequency band) used by the antenna of the device under test is measured.

As one measuring method related to the performance test of the wireless terminal according to the related art, a technology is known which targets a wireless module that is a measurement target disposed in a room where an electromagnetic wave can be shielded, rotates a rotating sheet and a module rotating arm, which constitute a rotation mechanism, at 180 degrees and 360 degrees around a first rotation axis and a second rotation axis, respectively, and measures a three-dimensional radiation pattern of a wireless module with respect to a radio signal transmitted from an antenna by a measuring device (for example, refer to Patent Document 1).

Further, as a measuring method for performing a performance test of a 5G wireless terminal according to the related art, a technique is known in which total radiated power (TRP) is measured based on an equivalent isotropically radiated power (EIRP) sample (for example, refer to Non-Patent Document 1).

RELATED ART DOCUMENT

Patent Document

[Patent Document 1] U.S. Pat. No. 9,377,495
[Non-Patent Document 1] 3GPP TR 38.803 V14.2.0 (2017-09) technical specifications (third generation partnership project (3GPP)) published in September 2017, chapter 10.2.2.5 OTA measurements in the radiative near field column (pages 159 to 161))

DISCLOSURE OF THE INVENTION

Problem that the Invention is to Solve

An item, on which measurement is performed while changing an angle of a rotation mechanism (positioner) on which a mobile terminal is installed under an OTA environment, includes effective isotropic radiated power-cumulative distribution function (EIRP-CDF), effective isotropic sensitivity-cumulative distribution function (EIS-CDF), and total radiated power (TRP), and the like.

The measurement item is obtained by accumulating measurement data of each power distribution at a plurality of measurement positions and calculating a final measured value, a long time is required for measurement, and call disconnection can occur due to a physical factor, such as a rotation angle, or some other short-term factors in the middle of the measurement.

The above-described mobile terminal testing device according to the related art does not have a function of reconnecting a call in a case where the call disconnection occurs during the measurement. For this reason, in the mobile terminal testing device according to the related art, in a case where the call disconnection occurs during the measurement, only an measurement operation may be continued without noticing the call disconnection, and, in that case, there are problems in that reliability of the measurement data obtained after the call disconnection occurs is lowered and an accurate measurement result of the measurement item cannot be obtained.

The present invention has been made to solve such a conventional problem, and an object of the present invention is to provide a mobile terminal testing device and a mobile terminal testing method which enable accurate measurement without data loss due to the call disconnection during the measurement for an item on which the measurement is performed while changing an angle of a mobile terminal under the OTA environment.

Means for Solving the Problem

In order to solve the above problems, according to a first aspect of the present invention, there is provided a mobile terminal testing device including: scanning means (16, 56) for performing scanning to rotate a mobile terminal (100), which is a device under test having an antenna under test (110), so as to sequentially face all preset orientations of a spherical coordinate system by using a center of the spherical coordinate system as a reference point; a measuring device (20) that is connected to a test antenna (5); measurement control means (10) for controlling the measuring device to measure a specific measurement item related to a radio signal in a frequency band, which is used by the antenna under test, by performing a measurement operation, a predetermined number of times, of transmitting a test signal from the test antenna to the mobile terminal, and receiving a signal under measurement transmitted from the antenna under test of the mobile terminal which has received the test signal by the test antenna at a measurement position where the mobile terminal faces a desired orientation, disconnection detection means (18a) for detecting disconnection of call connection during measurement at the measurement position; reconnection control means (18b) for performing reconnection of the call connection in a case where the disconnection of the call connection is detected by the disconnection detection means; and measurement return control means (18*c*) for returning to measurement of the measurement item from a measurement position subsequent to the measurement position where the call connection is disconnected after the reconnection of the call connection.

With the configuration, in the mobile terminal testing device according to the first aspect of the present invention, it is possible to return to each remaining measurement at the measurement position by performing the reconnection of the call connection even in a case where the call connection is disconnected during a regulated number of measurements at the measurement position where the device under test faces the desired orientation, and measurement data is not lost after the call connection is disconnected, so that it is possible to measure a predetermined measurement item with high accuracy at the measurement position, in addition to the measurement data obtained before the call connection is disconnected.

Further, in the mobile terminal testing device according to a second aspect of the present invention, the measurement control means may measure an equivalent isotropic radiated power (EIRP) cumulative distribution function or an EIS cumulative distribution number for all the orientations based on the signal under measurement received by the test antenna, and measures a total radiated power (TRP) which is a total sum of the EIRP in all the orientations.

With the configuration, in the mobile terminal testing device according to the second aspect of the present invention, it is possible to measure TRP with high accuracy in addition to EIRP-Cumulative Distribution Function (CDF) and EIS-CDF as the measurement item.

Further, in the mobile terminal testing device according to a third aspect of the present invention, in a case where the disconnection of the call connection is detected during TRP measurement is performed, the measurement control means may perform beam lock control for performing beam locking on a beam of the device under test by returning to the measurement position where the disconnection of the call connection is detected after the reconnection of the call connection and before the measurement of the measurement item is started from the measurement position subsequent to the measurement position where the disconnection of the call connection is detected.

With the configuration, in the mobile terminal testing device according to the third aspect of the present invention, even in a case where the disconnection of the call connection occurs during the TRP measurement, it is possible to maintain a beam-locked state in a beam peak direction, which is indispensable for the TRP measurement in a case of returning to the measurement of the remaining measurement points from the measurement point where the disconnection of the call connection, so that the measurement accuracy of the entire TRP does not deteriorate.

Further, in the mobile terminal testing device according to a fourth aspect of the present invention, the measuring device may include an NR measuring device (20) corresponding to an NR communication standard, and an LTE measuring device (25) corresponding to an LTE communication standard, and the detection of the disconnection of the call connection, the reconnection of the call connection, and the measurement of the specific measurement item may be performed in accordance with each of the NR and LTE communication standards.

With the configuration, the mobile terminal testing device according to the fourth aspect of the present invention can be applied to a test of the device under test in which each base station of NR and LTE is simulated, and can measure the measurement item, such as EIRP-CDF, EIS-CDF or TRP, with high accuracy in a non-stand-alone NR operation stage.

Further, the mobile terminal testing device according to a fifth aspect of the present invention may further include a radio anechoic box including an internal space, in which the scanning means and the test antenna may be provided in the internal space.

Further, in order to solve the above problems, according to a sixth aspect of the present invention, there is provided a mobile terminal testing method for testing a device under test using a mobile terminal testing device including scanning means (16, 56) for performing scanning to rotate a mobile terminal (100) having an antenna under test (110) so as to sequentially face all preset orientations of a spherical coordinate system by using a center of the spherical coordinate system as a reference point, and a measuring device (20) that is connected to a test antenna (5), the mobile terminal testing method including: a measurement control step (S1, S2) of controlling the measuring device to measure a specific measurement item related to a radio signal in a frequency band, which is used by the antenna under test, by performing a measurement operation, a predetermined number of times, of transmitting a test signal from the test antenna to the mobile terminal, and receiving a signal under measurement transmitted from the antenna under test of the mobile terminal which has received the test signal by the test antenna at a measurement position where the mobile terminal faces a desired orientation; a disconnection detection step (S3, S5) of detecting disconnection of call connection during measurement at the measurement position; a reconnection control step (S8, S9) of performing reconnection of the call connection in a case where the disconnection of the call connection is detected in the disconnection detection step; and a measurement return control step (S12, S2) of returning to the measurement of the measurement item from a measurement position subsequent to the measurement position where the call connection is disconnected after the reconnection of the call connection.

With the configuration, in the mobile terminal testing method according to the sixth aspect of the present invention, it is possible to return to each remaining measurement at the measurement position by performing the reconnection of the call connection even in a case where the call connection is disconnected during a regulated number of measurements at the measurement position where the device under test faces the desired orientation, and measurement data is not lost after the call connection is disconnected, so that it is possible to measure a predetermined measurement item with high accuracy at the measurement position, in addition to the measurement data obtained before the call connection is disconnected.

Advantage of the Invention

The present invention provides a mobile terminal testing device and a mobile terminal testing method which enable accurate measurement without data loss due to call disconnection during the measurement for an item on which the measurement is performed while changing an angle of a mobile terminal under an OTA environment.

BRIEF DESCRIPTION OF THE DRAWINGS

FIGS. 5A and 5B are diagrams showing total spherical scanning images of a device under test of the measuring device according to the embodiment of the present invention in an OTA chamber, in which FIG. 5A shows a disposition mode of the device under test with respect to a center of a spherical coordinate system, and FIG. 5B shows a distribution mode of angular sample points PS in the spherical coordinate system.

BEST MODE FOR CARRYING OUT THE INVENTION

Hereinafter, an embodiment of a measuring device and a measuring method according to the present invention will be described with reference to the accompanying drawings.

Figure 1:
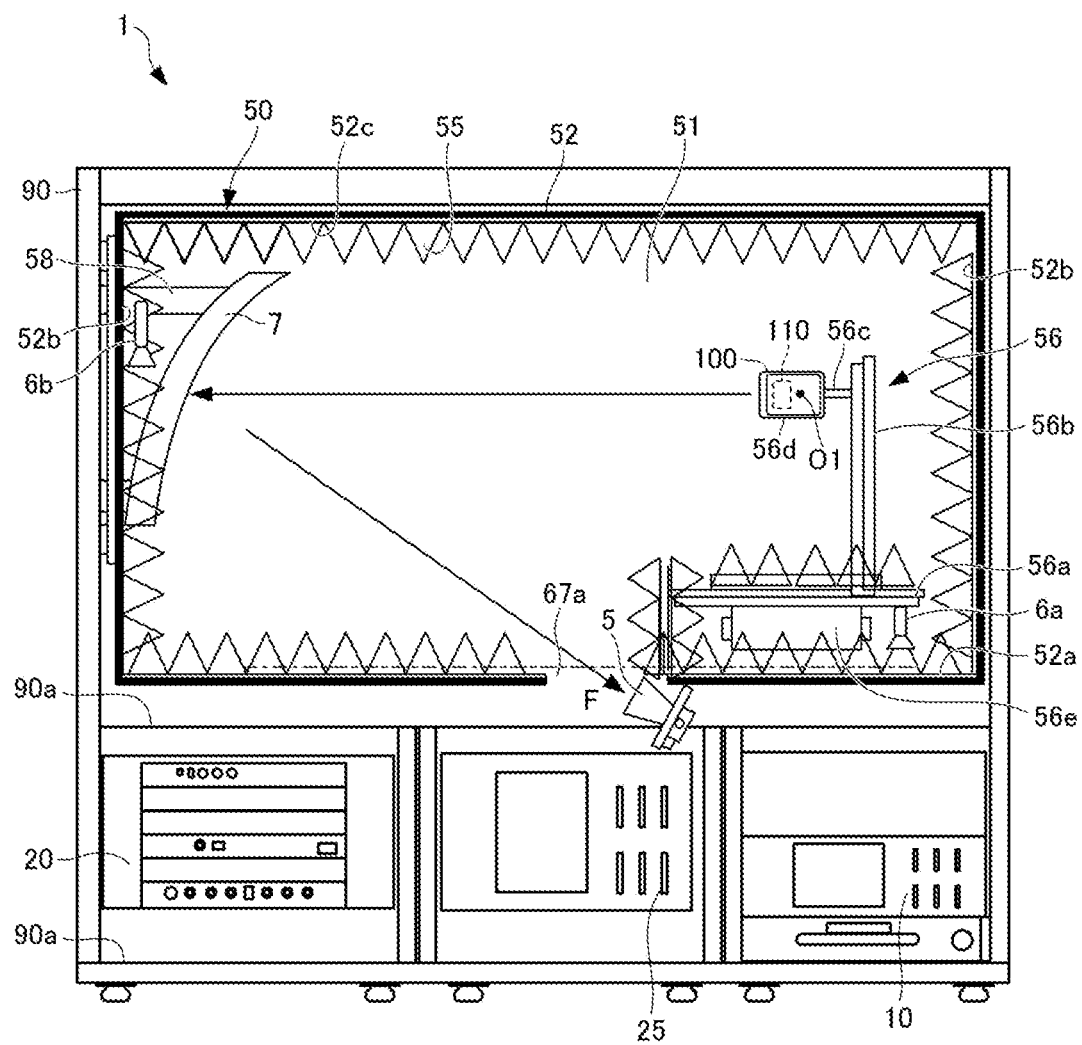
FIG. 1 is a diagram showing a schematic configuration of an entire measuring device according to an embodiment of the present invention.
Figure 2:
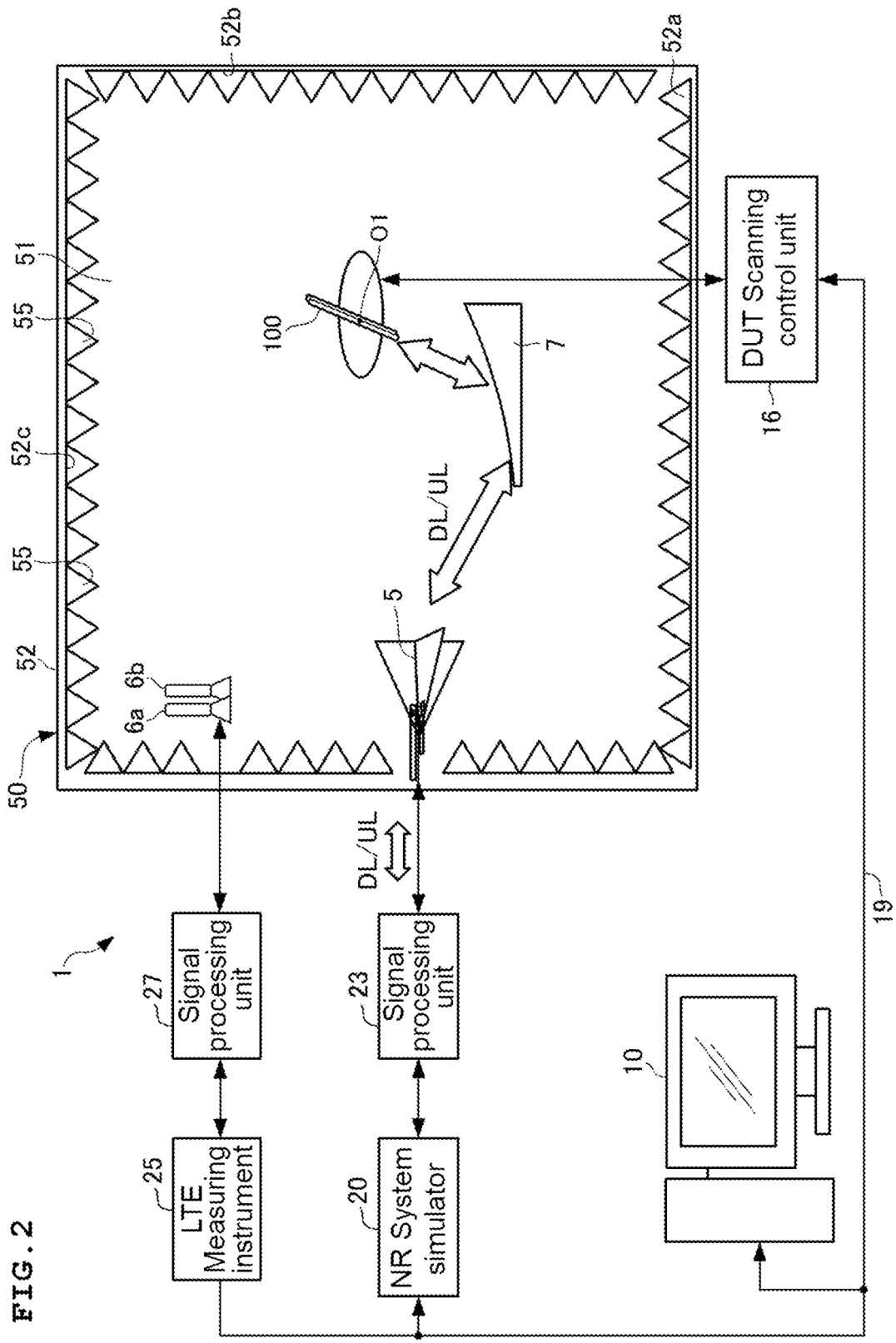
FIG. 2 is a block diagram showing a functional configuration of a measuring device according to the embodiment of the present invention.

First, a configuration of a measuring device 1 according to the embodiment of the present invention will be described with reference to FIGS. 1 to 4. The measuring device 1 constitutes the mobile terminal testing device of the present invention. The measuring device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measuring device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, an LTE measuring instrument 25, and an OTA chamber 50 is mounted on each rack 90a of the rack structure 90.

As shown in FIG. 2, the measuring device 1 according to the present embodiment includes the integrated control device 10, the NR system simulator 20, a signal processing unit 23, the LTE measuring instrument 25, a signal processing unit 27, and the OTA chamber 50.

For the configuration, here, the OTA chamber 50 will be described first for convenience. As shown in FIGS. 1 and 2, the OTA chamber 50 includes, for example, a metal housing main body 52 having a rectangular internal space 51, and accommodates a DUT 100 having an antenna 110, a test antenna 5, LTE test antennas 6a and 6b, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, in the OTA chamber 50, each element (the DUT 100, the test antenna 5, the LTE test antennas 6a and 6b, the reflector 7, and the DUT scanning mechanism 56) disposed in the internal space 51 has an enhanced function of regulating intrusion of radio waves from the outside and radiation of the radio waves to the outside. In this way, the OTA chamber 50 realizes an radio anechoic box having the internal space 51 that is not affected by a surrounding radio wave environment. The radio anechoic box used in the present embodiment is, for example, an Anechoic type.

Among those housed in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1×EV-DO, TD-SCDMA, or the like), wireless LAN (IEEE 802.11b/g/a/n/ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, LTE or 5G NR communication standard. The DUT 100 and the antenna 110 respectively constitute a device under test and an antenna of the device under test in the present invention.

In the internal space 51 of the OTA chamber 50, the DUT 100 is held by a part of mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5 and 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIG. 3) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIG. 3) capable of rotating around the roll axis (a rotation axis in a horizontal direction).

Figure 3:
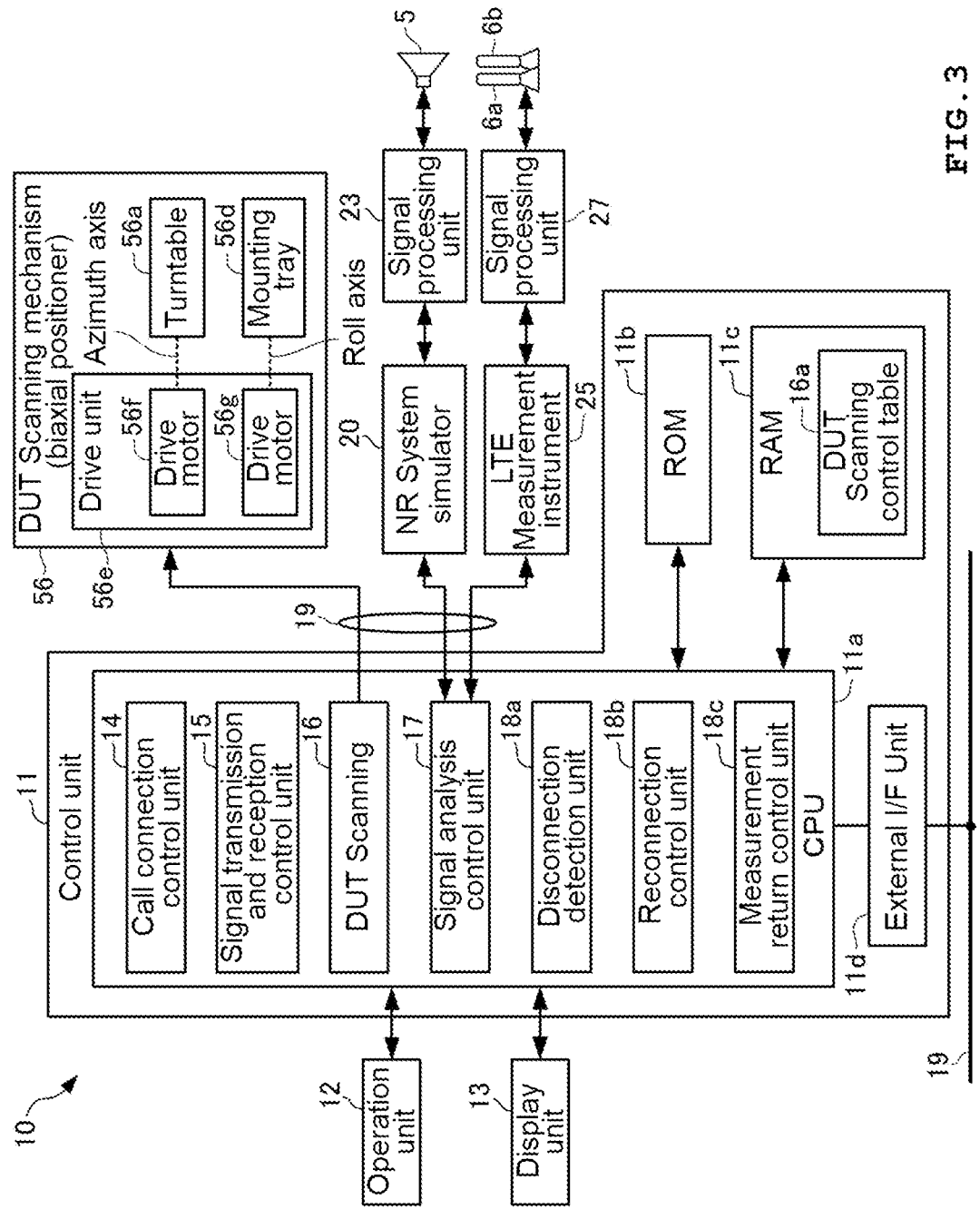
FIG. 3 is a block diagram showing functional configurations of an integrated control device of the measuring device according to the embodiment of the present invention and a controlled element thereof.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis in respective rotation direction thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3). Each of the drive unit 56e and the drive motors 56f and 56g constitutes drive means, first rotary drive means, and second rotary drive means in the present invention. The mounting tray 56d constitutes the device under test mounting portion in the present invention.

Figure 5A:
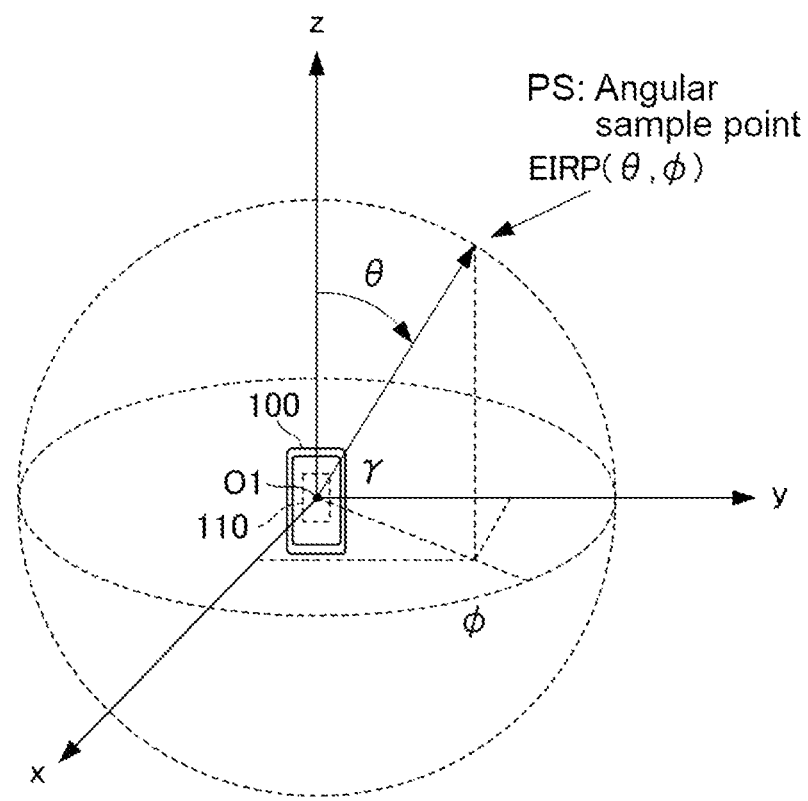
Figure 5B:
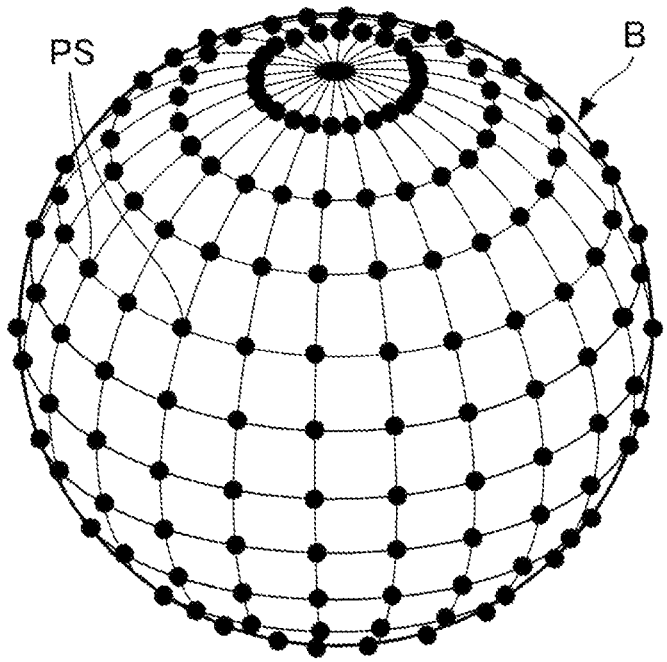

The DUT scanning mechanism 56 performs total spherical scanning which sequentially changes a posture of the DUT 100 to a state in which the antenna 110 faces all orientations of a surface of the sphere while assuming that the DUT 100 mounted (held) on the mounting tray 56d is disposed, for example, at a center O1 of the sphere (refer to a sphere B in FIGS. 5A and 5B). Control of the DUT scanning in the DUT scanning mechanism 56 is performed by a DUT scanning control unit 16 which will be described later. The DUT scanning mechanism 56 and the DUT scanning control unit 16 constitute scanning means in the present invention.

The test antenna 5 is attached to a required position on the bottom surface 52a of the housing main body 52 of the OTA chamber 50 by using an appropriate holder (not shown). An attachment position of the test antenna 5 is a position at which visibility can be secured from the reflector 7 via an opening 67a provided on the bottom surface 52a. The test antenna 5 uses a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that receives the test signal. The test antenna 5 is disposed so that a light reception surface thereof becomes a focal position F of the reflector 7. The reflector 7 is not always required in a case where the test antenna 5 can be disposed so that the light reception surface thereof faces the DUT 100 and appropriate light reception can be performed.

In a case where LTE-related measurement of the DUT 100 is performed in the OTA chamber 50, the LTE test antennas 6a and 6b transmit the LTE test signal from the LTE measuring instrument 25 to the DUT 100 and receives an LTE signal under measurement transmitted from the DUT 100 which receives the LTE test signal. The two LTE test antennas 6a and 6b are provided so that transmission and reception of a high-quality radio signal can be always performed with the DUT 100 in the LTE-related measurement, and any one radio signal can be selectively used.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the light reception surface of the test antenna 5.

Subsequently, configurations of the integrated control device 10, the NR system simulator 20, and the LTE measuring instrument 25 will be described.

As shown in FIG. 2, the integrated control device 10 is communicably connected to the NR system simulator 20 and the LTE measuring instrument 25 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20, the LTE measuring instrument 25, and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measuring device 1, and performs comprehensive control on the NR system simulator 20, and the LTE measuring instrument 25 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20, the LTE measuring instrument 25, and the drive unit 56e of the DUT scanning mechanism (biaxial positioner) 56 via the network 19. An operation unit 12 and a display unit 13 are connected to the input and output port. The operation unit 12 is a functional unit for inputting various information such as commands, and the display unit 13 is a functional unit for displaying various information such as an input screen, measurement results, and the like of the various information.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, a disconnection detection unit 18a, a reconnection control unit 18b, and a measurement return control unit 18c. The call connection control unit 14, the signal transmission and reception control unit 15, the DUT scanning control unit 16, the signal analysis control unit 17, the disconnection detection unit 18a, the reconnection control unit 18b, and the measurement return control unit 18c are also realized by executing a predetermined program stored in the ROM 11b in the work area of the RAM 11c by the CPU 11a.

The call connection control unit 14 drives the test antenna 5 via the NR system simulator 20 and the signal processing unit 23 to transmit and receive a control signal (radio signal) to and from the DUT 100, thereby performing control to establish a call (a state in which the radio signal can be transmitted and received) between the NR system simulator 20 and the DUT 100. The call connection control unit 14 also transmits and receives a control signal (radio signal) to and from the DUT 100 by driving the LTE test antennas 6a and 6b via the LTE measuring instrument 25 and the signal processing unit 27, thereby performing control to establish a call (a state in which radio signal can be transmitted and received) between the LTE measuring instrument 25 and the DUT 100.

The signal transmission and reception control unit 15 performs a control of monitoring an user operation in the operation unit 12, transmitting a signal transmission command to the NR system simulator 20 after the call is established through call connection control, by being triggered with predetermined measurement start operation related to the measurement of transmission and reception characteristics of the DUT 100, and transmitting the test signal from the NR system simulator 20 via the test antenna 5, and a control of transmitting a signal reception command and receiving the signal under measurement via the test antenna 5. Similarly, the signal transmission and reception control unit 15 performs a control of transmitting a signal transmission command to the LTE measuring instrument 25 after the call is established through the call connection control, and transmitting the LTE test signal from the LTE measuring instrument 25 via the LTE test antennas 6a and 6b, and a control of receiving the LTE signal under measurement via the LTE test antennas 6a and 6b.

The DUT scanning control unit 16 drives and controls the drive motors 56f and 56g of the DUT scanning mechanism 56 to perform total spherical scanning of the DUT 100 mounted on the mounting tray 56d of the DUT mounting portion 56c. In order to realize the control, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

In a case where the total spherical scanning of the DUT 100 is performed, the signal analysis control unit 17 captures each of the radio signals related to NR and LTE and received by the test antenna 5 and the LTE test antennas 6a and 6b via the NR system simulator 20 and the LTE measuring instrument 25, and performs an analysis process (measurement process) on the radio signal as a signal of a designated measurement item.

The disconnection detection unit 18a detects disconnection of call connection between the NR system simulator 20 and the DUT 100 and between the LTE measuring instrument 25 and the DUT 100 during measurement of the designated measurement item at each angular sample point PS (measurement position) related to the total spherical scanning of the DUT 100.

In a case where the disconnection detection unit 18a detects the disconnection of the call connection, the reconnection control unit 18b reconnects the call connection between the NR system simulator 20 and the DUT 100 in which the call connection is disconnected, or between the LTE measuring instrument 25 and the DUT 100.

After the call connection is reconnected between the NR system simulator 20 and the DUT 100 or between the LTE measuring instrument 25 and the DUT 100 by the reconnection control unit 18b, the measurement return control unit 18c performs control to return to measurement of the designated measurement item of the remaining number of times from the measurement position where the call connection is disconnected.

Figure 4A:
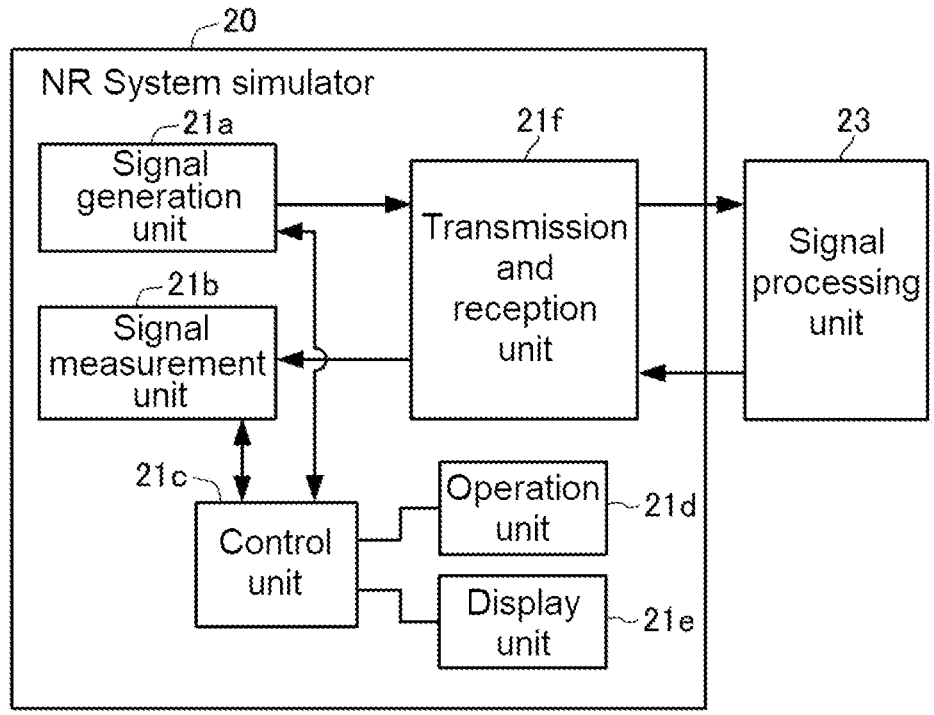
FIGS. 4A and 4B are block diagrams showing functional configurations of an NR system simulator and an LTE measuring instrument in the measuring device according to the embodiment of the present invention.

As shown in FIG. 4A, the NR system simulator 20 includes a signal generation unit 21a, a transmission and reception unit 21f, a signal measurement unit 21b, a control unit 21c, an operation unit 21d, and a display unit 21e. The NR system simulator 20 constitutes the signal generator of the present invention.

The signal generation unit 21a generates a signal (baseband signal) that becomes a source of the test signal. The transmission and reception unit 21f functions as an RF unit that generates a test signal corresponding to a frequency of each communication standard from the signal generated by the signal generation unit 21a and sends the test signal to the signal processing unit 25, and restores the baseband signal from the signal under measurement which is sent from the signal processing unit 25. The signal measurement unit 21b performs measurement process of the signal under measurement based on the baseband signal restored by the transmission and reception unit 21f.

A control unit 21c comprehensively controls each of the functional units including the signal generation unit 21a, the signal measurement unit 21b, the operation unit 21d, and the display unit 21e. The operation unit 21d is a functional unit for inputting various information such as commands, and the display unit 21e is a functional unit for displaying various information such as an input screen of the various information and measurement results.

Figure 4B:
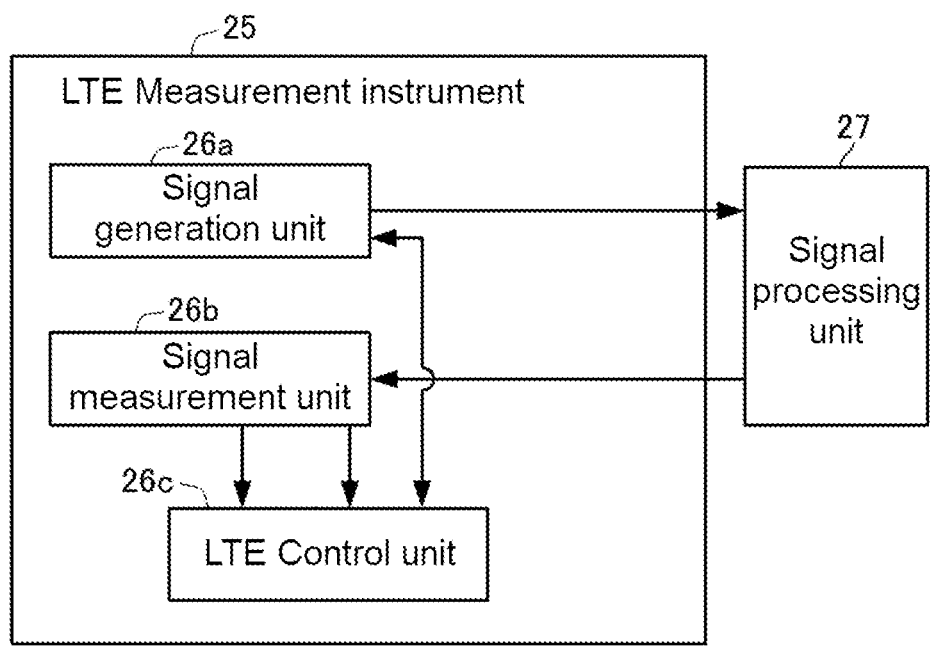

As shown in FIG. 4B, the LTE measuring instrument 25 includes a signal generation unit 26a, a signal measurement unit 26b, and an LTE control unit 26c. The signal generation unit 26a generates an LTE test signal to be transmitted to the DUT 100 via the signal processing unit 27 and the LTE test antennas 6a and 6b, and the signal measurement unit 26b receives the LTE test signal transmitted by the DUT 100 that receives the LTE test signal via the LTE test antennas 6a and 6b and the signal processing unit 27, and performs the measurement process thereof. An LTE control unit 26c comprehensively controls the signal generation unit 26a, the signal measurement unit 26b, and the operation unit 21d under the control of the control unit 11 of the integrated control device 10.

In the measuring device 1 having the above-described configuration, the DUT 100 is mounted on the mounting tray 56d of the DUT scanning mechanism 56 (biaxial positioner) in the internal space 51 of the OTA chamber 50, and it is possible to measure the measurement item, such as EIRP-CDF, EIS-CDF, or TRP, related to the radio signal of the DUT 100 while rotating the DUT 100 in biaxial (azimuth axis and roll axis) directions (while changing an angle of the positioner) for each mounting tray 56*d*.

Here, control (total spherical scanning) of an angle of the DUT 100 by changing the angle of the biaxial positioner, which is required in a case of measuring each of the measurement items described above, will be described with reference to FIGS. 5 and 6.

Generally, related to measurement of radiated power targeting the DUT 100, a method for measuring equivalent isotropic radiated power (EIRP) and a method for measuring total radiated power (TRP) are known. The EIRP is, for example, a power value measured at each measurement point (θ, φ) in a spherical coordinate system (r, θ, φ) shown in FIG. 5A. On the other hand, the TRP is obtained by measuring the EIRP in all orientations of the spherical coordinate system (r, θ, φ), that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

In the present embodiment, the number of divisions Nθ and Nφ for calculating the total radiated power (TRP) are set to, for example, 12, respectively. As a result, in the present embodiment, the number of angular samples (N) is obtained as N=132 (=(12-1)×12). 132 angular sample points PS obtained as above are located as shown in FIG. 5B when represented on a surface of the sphere B.

In the measuring device 1 according to the present embodiment, as shown in FIG. 5B, the EIRP is measured at positions of 132 points equidistant from the reference point of the spherical coordinate system (r, θ, φ), and, further, the EIRP is added at positions of all the point. Further, based on a result of addition of each EIRP, that is, a total sum of the EIRP at all the angular sample points PS of 132 points, the total radiated power (TRP) of the DUT 100 is obtained.

In a case where TRP measurement is performed, the integrated control device 10 drives and controls the DUT scanning mechanism 56 to perform the total spherical scanning of the DUT 100. In the total spherical scanning of the DUT 100, the integrated control device 10 rotationally drives the turntable 56*a* around the azimuth axis while repeatedly driving/non-driving the drive motor 56*f*, and rotationally drives the mounting tray 56*d* around the roll axis while repeatedly driving/non-driving the drive motor 56*g*. At that time, the integrated control device 10 performs control so that the drive motor 56*f* and the drive motor 56*g* are non-driven at each timing in which the antenna surface of the antenna 110 faces one angular sample point PS. By controlling the total spherical scanning of the DUT 100, the DUT 100 mounted on the mounting tray 56*d* is rotationally driven around the reference point so that the antenna surface of the antenna 110 sequentially faces (orients) all the angular sample points PS of the sphere B while the antenna 110 is held at a position of the reference point which is the center of the sphere B that regulates the spherical coordinate system (r, θ, φ).

Figure 6:
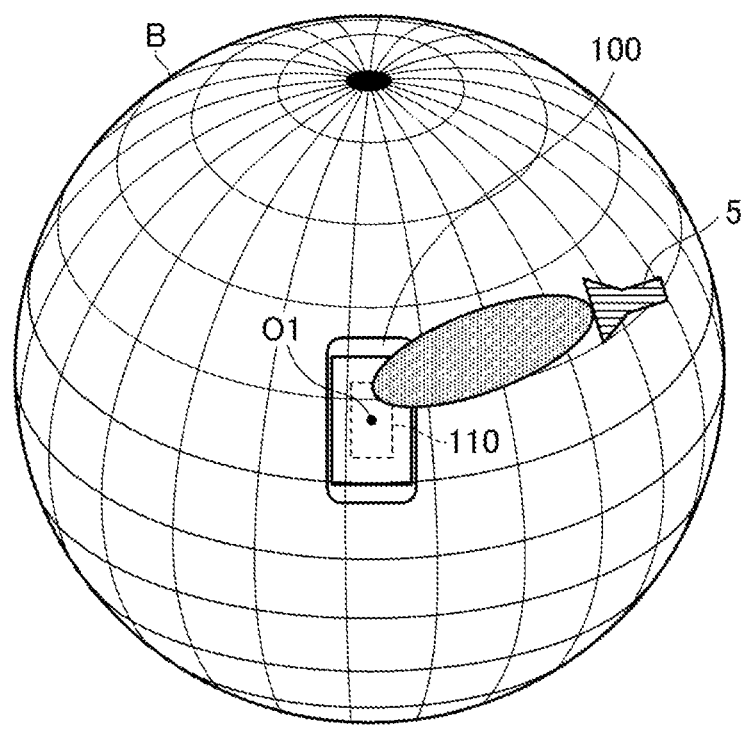
FIG. 6 is a diagram explaining a disposition mode of a test antenna 5 in the OTA chamber of the measuring device according to the embodiment of the present invention using the spherical coordinate system (r, 0, p) shown in FIGS. 5A and 5B.

As shown in FIG. 6, the test antenna 5 is disposed at a position of a specific angular sample point PS (one point) in the spherical coordinate system (r, θ, φ). In the above-described total spherical scanning, the DUT 100 is driven (scanned) so that the antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, the signal under measurement that is received via the test antenna 5.

In the integrated control device 10, in accordance that the DUT 100 is scanned so as to pass through each angular sample point PS in a φ direction while maintaining a certain angle of θ in the spherical coordinate system (r, θ, φ) shown in FIG. 5B, the NR system simulator 20 is driven to generate the test signal by the signal generation unit 21*a* and the transmission and reception unit 21*f*, and the test signal is transmitted from the test antenna 5 via the signal processing unit 23. Here, in a case where the DUT 100 receives the test signal at the antenna 110, the DUT 100 sends out a response signal corresponding to the reception of the test signal.

The integrated control device 10 further drives the NR system simulator 20 so that a signal, which is transmitted by the DUT 100 in response to the reception of the test signal and is received by the test antenna 5, is received by the signal measurement unit 21*b* as the signal under measurement from the signal processing unit 25 via the transmission and reception unit 21*f*. Further, the integrated control device 10 drives and controls the signal measurement unit 21*b* so as to perform a signal processing related to the measurement of the EIRP based on the received signal under measurement. In a case where the measurement control of the EIRP is performed in accordance with the total spherical scanning of the DUT 100 which passes through all the angular sample points PS by changing the angle of θ, it is possible to measure the EIRP for all the angular sample points PS of the spherical coordinate system (r, θ, φ) to correspond to NR in the NR system simulator 20. Further, the integrated control device 10 can obtain the TRP which is the total sum of the EIRP measurement values for all the angular sample points PS.

Further, in accordance with the drive control of the NR system simulator 20 for measuring the EIRP and the TRP corresponding to the NR, the integrated control device 10 drives and controls the LTE measuring instrument 25 to measure the EIRP and the TRP corresponding to the LTE which constitutes non-standalone together with the NR.

Related to the drive control of the LTE measuring instrument 25 in this case, the integrated control device generates the LTE test signal for performing measurement corresponding to the LTE from the signal generation unit 26*a* of the LTE measuring instrument 25, and transmits the LTE test signal from the LTE test antenna 6*a* or 6*b* via the signal processing unit 27. Here, in a case where the DUT 100 receives the LTE test signal by the antenna 110, the DUT 100 sends out a response signal corresponding to the reception of the LTE test signal.

The integrated control device 10 further drives the LTE measuring instrument 25 so that a signal, which is transmitted by the DUT 100 in response to the reception of the LTE test signal and is received by the LTE test antenna 6*a* or 6*b*, is received by the signal measurement unit 26*b* as the LTE signal under measurement via the signal processing unit 27. Further, the integrated control device 10 drives and controls the signal measurement unit 26*b* so as to perform the signal processing related to the measurement of the EIRP and the TRP corresponding to the NR based on the received LTE signal under measurement.

Further, the integrated control device 10 has a control function to prevent a situation in which it is difficult to continue measurement due to the disconnection of the call connection between the NR system simulator 20 or the LTE measuring instrument 25 and the DUT 100 during measurement of the measurement items, such as EIRP-CDF, EIS-CDF, and TRP, while changing the angle of the biaxial positioner (DUT scanning mechanism 56) described above. The control function is realized by the disconnection detection unit 18a, the reconnection control unit 18b, and the measurement return control unit 18c (refer to FIG. 3) provided in the control unit 11 of the integrated control device 10.

Based on this point, hereinafter, a measurement control operation, which is performed by the integrated control device 10 in accordance with the total spherical scanning of the DUT 100 in the OTA chamber 50 of the measuring device 1 according to the present embodiment, will be described with reference to the flowchart shown in FIG. 7. The flowchart shown in FIG. 7 includes a processing procedure (steps S3 to S6 and S8 to S13 in FIG. 7) of returning to measurement from a measurement position, at which the call disconnection occurs, by detecting the disconnection of the call connection and performing reconnection.

In the measuring device 1, in a case where the measurement start operation of a predetermined measurement item is performed after setting the DUT 100 to be tested in the DUT mounting portion 56c of the DUT scanning mechanism 56 of the OTA chamber 50, the call connection control unit 14 of the integrated control device 10 drives the NR system simulator 20, and transmits and receives a control signal (radio signal) to and from the DUT 100 via the test antenna 5, thereby performing the call connection control in order to establish a link (call) between the NR system simulator 20 and the DUT 100.

Here, while the NR system simulator 20 performs the call connection control of wirelessly transmitting the control signal (call connection request signal) with respect to the DUT 100 via the test antenna 5, setting a frequency at which the DUT 100 that receives the call connection request signal is requested to be connected, and receiving the control signal (call connection response signal) which is being transmitted. With the call connection control, between the NR system simulator 20 and the DUT 100, a state is established in which it is possible to transmit and receive a radio signal in a regulated frequency band via the test antenna 5 disposed at the focal position F of the reflector 7 and the reflector 7. After that, the NR system simulator 20 and the DUT 100 can transmit and receive the radio signal which is necessary to measure the designated measurement item specified in the measurement start operation.

For the transmission and reception of the radio signal related to the above measurement, when viewed from a side of the DUT 100, a process of receiving the radio signal sent from the NR system simulator 20 via the test antenna 5 and the reflector 7 is set as a downlink (DL) process, and, on the other hand, a process of transmitting the radio signal to the NR system simulator 20 via the reflector 7 and the test antenna 5 is set as an uplink (UL) process. The test antenna 5 is used to execute a process of establishing the link (call) between the NR system simulator 20 and the DUT 100, the downlink (DL) process, and uplink (UL) process after the link is established, and is referred to as a link antenna.

Similarly, the call connection control unit 14 transmits and receives the control signal between the LTE measuring instrument 25 and the DUT 100 via the LTE test antennas 6a and 6b, thereby performing call connection control for establishing the link (call) between the LTE measuring instrument 25 and the DUT 100. Thereafter, the LTE measuring instrument 25 and the DUT 100 can transmit and receive the radio signal which is necessary to measure the designated measurement item via the LTE test antennas 6a and 6b.

Figure 7:
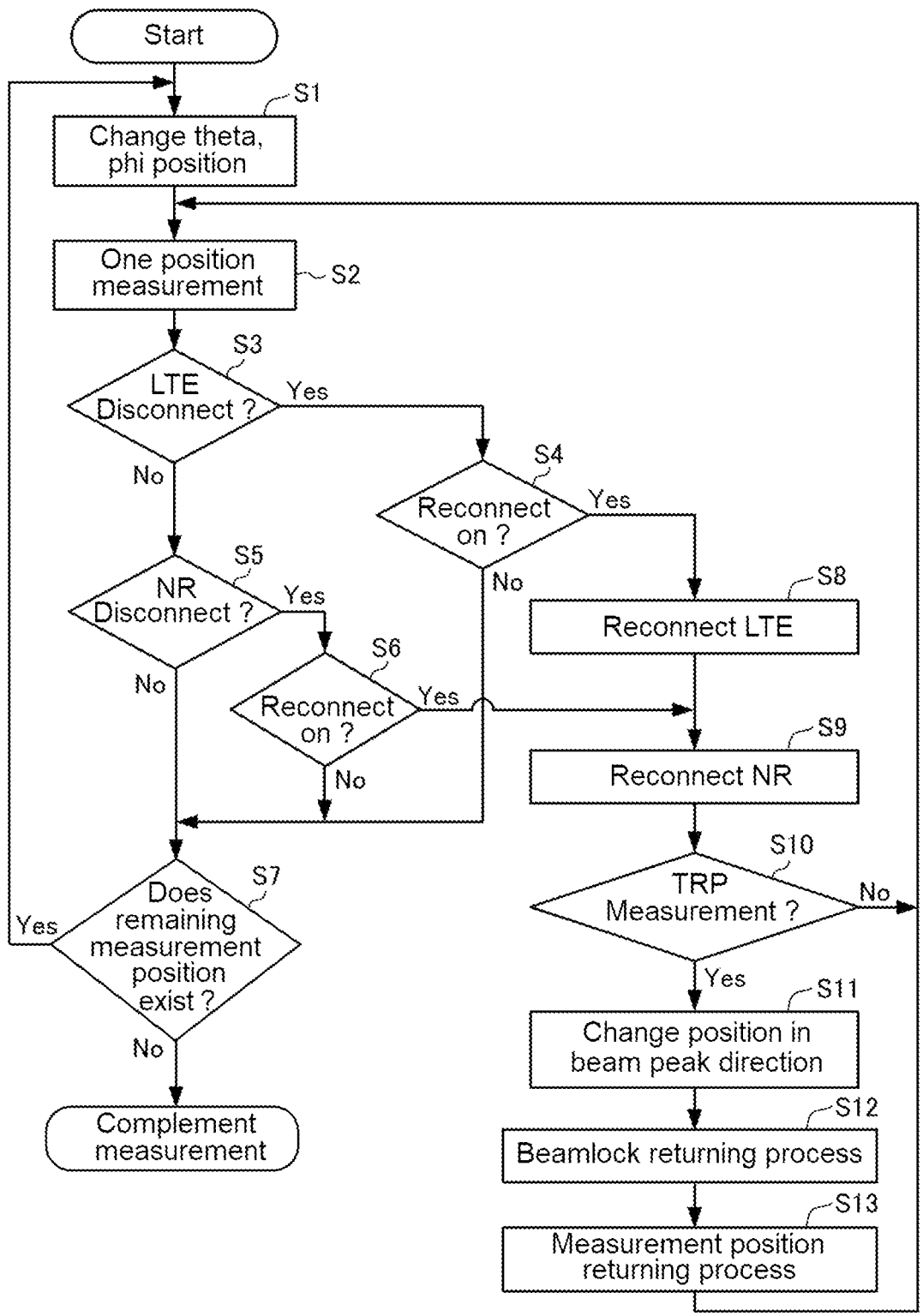
FIG. 7 is a flowchart showing a measurement control operation of the device under test by the integrated control device of the measuring device according to the embodiment of the present invention.

The measuring device 1 starts the measurement according to the flowchart shown in FIG. 7 in a case where the call connection is established between the NR system simulator 20 and the DUT 100 and between the LTE measuring instrument 25 and the DUT 100.

In a case where the measurement is started, the DUT scanning control unit 16 under the control of the control unit 11 of the integrated control device 10 drives the biaxial positioner according to a preset measurement condition to rotate to an angular position ($\theta$, $\varphi$) corresponding to an initial measurement position in the spherical coordinate system (r, $\theta$, $\varphi$) shown in FIG. 5A (step S1).

Subsequently, the control unit 11 drives and controls the NR system simulator 20 and the LTE measuring instrument 25, and performs control so that measurement of the measurement item (designated measurement item: EIRP-CDF, EIS-CDF, TRP, or the like) which is preset (designated) at a measurement position (the initial measurement position in the initial measurement) corresponding to the angular position of the biaxial positioner in step S1 (step S2).

In order to perform the measurement process in step S2, it is premised that the call connection is performed between the NR system simulator 20 and the DUT 100 or between the LTE measuring instrument 25 and the DUT 100 in advance under the control of the call connection control unit 14. In a call connection state, the signal transmission and reception control unit 15 causes the test signal and the LTE test signal are respectively transmitted from the NR system simulator 20 and the LTE measuring instrument 25, and the signal analysis control unit 17 receives the signal under measurement and the LTE signal under measurement which are respectively transmitted as responses by the DUT 100 in response to the reception of the test signal and the LTE test signal, thereby performing the measurement process (analysis process) of the designated measurement item.

During a measurement operation of the designated measurement item at a current measurement position in step S2, the disconnection detection unit 18a executes a process of monitoring an exchange situation of the LTE test signal and the LTE signal under measurement via the LTE test antennas 6a and 6b between the LTE measuring instrument 25 and the DUT 100, and detecting whether or not an LTE call connection is disconnected based on a monitoring result thereof (step S3).

In a case where it is detected that the LTE call connection is not disconnected (NO in step S3), subsequently, the disconnection detection unit 18a executes a process of further monitoring the exchange situation of the test signal and the signal under measurement via the test antenna 5 between the NR system simulator 20 and the DUT 100 in addition to the above-described exchange situation of the LTE test signal and the LTE signal under measurement, and detecting whether or not the NR call connection is disconnected (step S5) based on a monitoring result thereof.

Here, in a case where it is detected that the NR call connection is not disconnected (NO in step S5), the DUT scanning control unit 16 determines whether or not a remaining measurement position exists (step S7).

Here, in a case where it is determined that the remaining measurement position exists (YES in step S7), the DUT scanning control unit 16 drives the biaxial positioner to rotate to the angular position of ($\theta$, $\varphi$) corresponding a subsequent measurement position in the spherical coordinate system (r, $\theta$, $\varphi$) (step S1).

Next, the control unit 11 drives and controls the NR system simulator 20 and the LTE measuring instrument 25 to measure the designated measurement item at a second measurement position corresponding to the angular position of the biaxial positioner in step S1 (step S2).

Thereafter, while the processes in steps S3 and S5 are continued, the disconnection of the call connection is not detected in either step S3 or S5, and it is determined that the remaining measurement position exists in step S7, the control unit 11 repeatedly performs the control of rotating the biaxial positioner to the angular position of (θ, φ) corresponding to the next measurement position in step S1 and measuring the designated measurement item at the measurement position in step S2, while updating the measurement position.

During the period, that is, while the control to measure the designated measurement item while updating the measurement position is repeatedly performed, for example, in a case where it is detected that the LTE call connection is disconnected in step S3 (YES in step S3), the reconnection control unit 18b subsequently checks setting content of reconnection setting that is set in advance, and determines whether or not a parameter of the reconnection is on (step S4).

In a case where it is determined that the parameter of the reconnection is on (YES in step S4), the reconnection control unit 18b performs control to establish the call connection again between the LTE measuring instrument 25 and the DUT 100 by the call connection control unit 14 (step S8). Further, the reconnection control unit 18b performs control to establish the call connection again between the NR system simulator 20 and the DUT 100 by the call connection control unit 14 (step S9).

Further, while the control to update the measurement position and to measure the designated measurement item is repeatedly performed, for example, in a case where it is detected that the call connection of NR is disconnected in step S5 (YES in step S5), the reconnection control unit 18b checks the setting content of the reconnection setting set in advance, and determines whether or not the parameter of the reconnection is on (step S6).

In a case where it is determined that the parameter of the reconnection is on (YES in step S6), the reconnection control unit 18b performs control to establish the call connection between the NR system simulator 20 and the DUT 100 by the call connection control unit 14 (step S9).

In a case where the parameter of the reconnection is off in step S4 (NO in step S4) and the parameter of the reconnection is off in step S6 (NO in step S6), the control unit 11 continues the control to move to a next measurement position through steps S7 and S1, respectively.

In a case where the call connections of LTE and NR are reconnected by reconnection control in steps S8 and S9 or in a case where the call connection of the NR is reconnected by the reconnection control in step S9, the measurement return control Unit 18c next determines whether or not the designated measurement item is TRP (step S10).

In a case where it is determined that the designated measurement item is not TRP (NO in step S10), the measurement return control unit 18c performs control to return to step S2 and restart measurement of the designated measurement item (here, other than TRP) at the measurement position (previous measurement point of the disconnection of the call connection) at which the disconnection of the call connection is detected in either step S3 or S5 one time before.

Subsequently, the control unit 11 performs the process in steps S3, S5, and S7 for the previous measurement point of the disconnection of the call connection. During the period, in a case where it is determined that the remaining measurement position exists in step S7 (YES in step S7), thereafter, the DUT scanning control unit 16 performs control to repeatedly perform the processes S1 to S3, S5, and S7 according to the measurement related to the designated measurement item at each measurement position while sequentially rotating the biaxial positioner to the angular position corresponding to the next measurement position (θ, φ). The processes in S1 to S3, S5, and S7 at each measurement position is performed until a final measurement position is reached.

On the other hand, in a case where it is determined that the designated measurement item is TRP in step S10 (YES in step S10), the measurement return control unit 18c continuously executes beam lock control to lock the beam (transmission power) of the DUT 100, which is an indispensable routine in the TRP measurement, in the beam peak direction.

For the beam lock control, after the reconnection of the call connection in step S8 or step S9, the measurement return control unit 18c rotates the biaxial positioner by the DUT scanning control unit 16 to the angular position of (θ, φ) at which the DUT 100 corresponds to the measurement position in the beam peak direction (step S1*l*).

Subsequently, the measurement return control unit 18c executes a beam lock return process that locks the beam direction of the DUT 100 to face the measurement position in the beam peak direction again (step S12).

In a case where the beam lock return process in step S12 is completed, the measurement return control unit 18c performs control to return to step S2 through the measurement position return process (step S13), and restart the measurement of the designated measurement item (here, TRP) at the measurement position (previous measurement point of the disconnection of the call connection) at which the disconnection of the call connection is detected in either step S3 or S5 one time before.

Thereafter, the DUT scanning control unit 16 performs control to repeatedly perform the processes in steps S1 to S3, S5, and S7 according to the TRP measurement at each measurement position while sequentially rotating the biaxial positioner to the angular position (θ, φ) corresponding to the next measurement position. The processes in S1 to S3, S5, and S7 at each measurement position is performed until the final measurement position is reached, and a total sum of the measurement results of all the measurement positions from the initial measurement position to the final measurement position is calculated, and a series of TRP measurement is completed.

Figure 8:
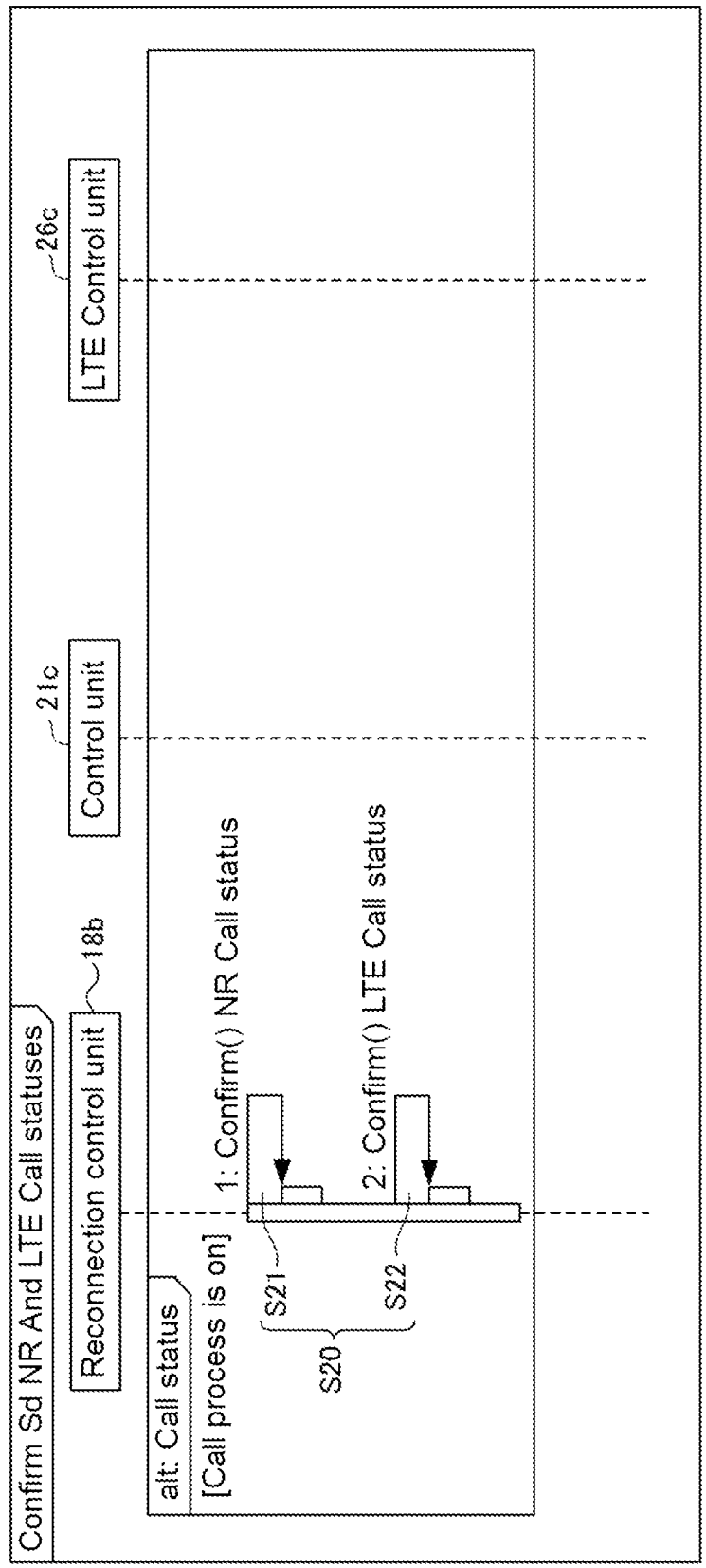
FIG. 8 is a diagram showing a call status confirmation process sequence among the integrated control device, the NR system simulator, and the LTE measuring instrument applied to a call connection disconnection determination process in steps S3 and S5 of FIG. 7.

During the series of processes shown in FIG. 7, the disconnection of the call connection determination process in steps S3 and S5 can be realized by a call status confirmation process sequence shown in FIG. 8. As shown in FIG. 8, the reconnection control unit 18b of the integrated control device 10 is accessibly connected to the control unit 21c of the NR system simulator 20 and the LTE control unit 26c of the LTE measuring instrument 25 via the network 19.

In steps S3 and S5 of FIG. 7, the reconnection control unit 18b executes a call status (communication situation) confirmation process sequence between the control unit 21c of the NR system simulator 20 and the LTE control unit 26c of the LTE measuring instrument 25 (step S20). Specifically, in step S3, the reconnection control unit 18b performs a process of accessing the LTE control unit 26c of the LTE measuring instrument 25 and confirming the LTE call status (step S22). Here, in a case where the LTE call status is in communication, it is determined that the call connection related to the LTE is maintained, and, in a case where the LTE call status is a non-communication state, it is also determined that the call connection is disconnected.

On the other hand, in step S5, the reconnection control unit 18b performs a process of accessing the control unit 21c of the NR system simulator 20 and confirming the NR call status (step S21). Here, in a case where the NR call status is in communication, it is determined that the call connection related to the NR is maintained, and, in a case where the LTE call status is the non-communication state, it is also determined that the call connection is disconnected.

Figure 9:
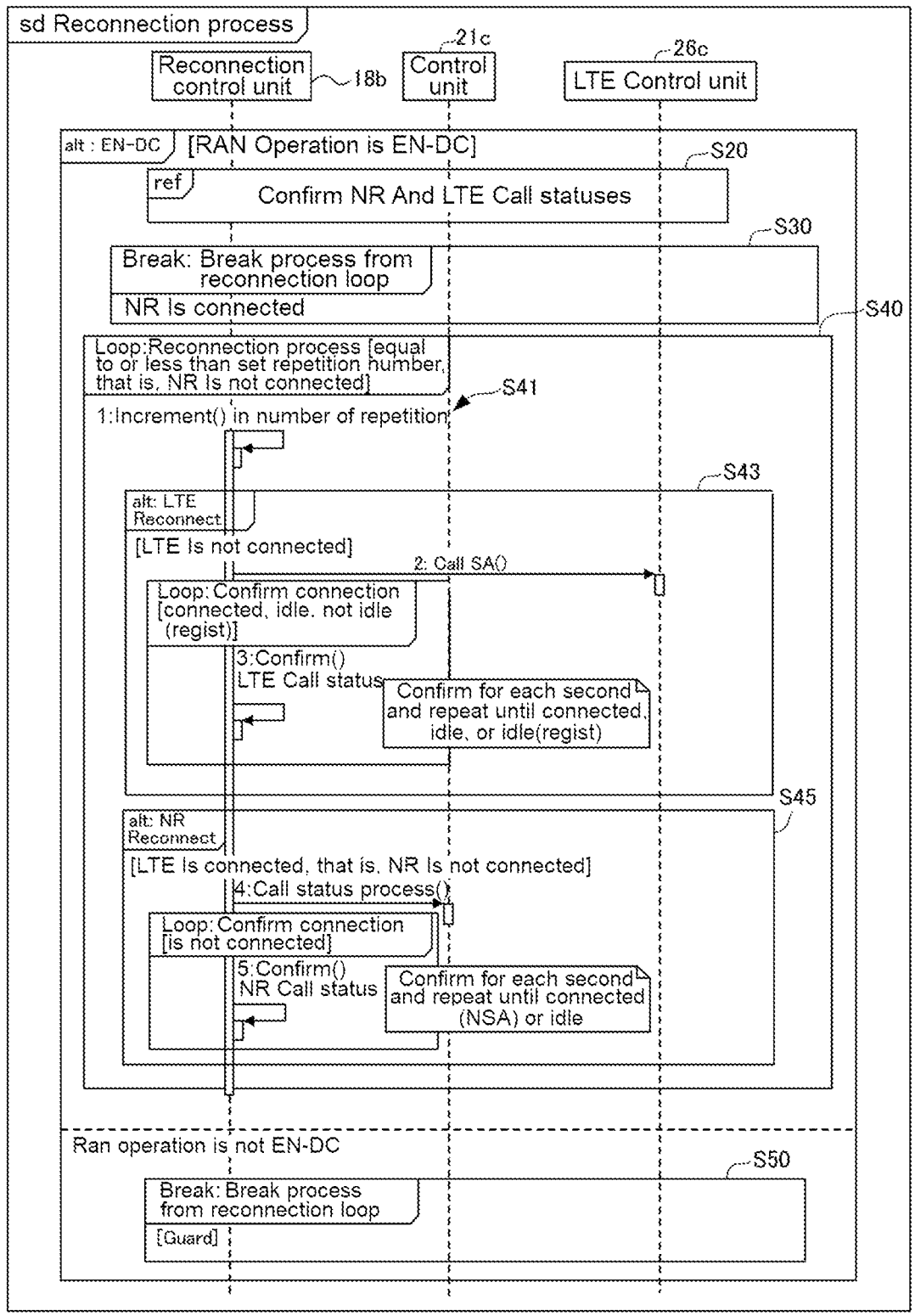
FIG. 9 is a diagram showing a control sequence among the integrated control device, the NR system simulator, and the LTE measuring instrument applied to a process related to reconnection from detection of call disconnection in steps S3 and S5 and steps S8 and S9 of FIG. 7.

During the series of processes shown in FIG. 7, the processes according to the detection of the call disconnection and the reconnection in steps S3, S5, S8, and S9 can be realized by a control sequence shown in FIG. 9. As shown in FIG. 9, under an environment in which the control unit 21c of the NR system simulator 20 and the LTE control unit 26c of the LTE measuring instrument 25 are accessibly connected via the network 19, the reconnection control unit 18b of the integrated control device 10 executes the call status confirmation process (step S20).

A process in step S20 can be realized by a sequence similar to the call status confirmation process sequence shown in FIG. 8.

In a case where neither LTE nor NR is detected that the call connection is disconnected in step S20, a reconnection loop is not entered and the process proceeds to a next process (step S30).

On the other hand, in a case where it is detected that the call connection is disconnected for at least one of LTE and NR in step S20, the reconnection control unit 18b executes the reconnection process (step S40).

In the reconnection process in step S40, the reconnection control unit 18b performs a process of reconnecting the LTE call connection in a case where the disconnection of the LTE call connection is detected (step S43), and performs a process of reconnecting the NR call connection in a case where the disconnection of the NR call connection is detected (step S45).

In a case where either the process in step S43 or S45 is performed, the reconnection control unit 18b first executes a process of incrementing the number of times of execution of the reconnection. Thereafter, in a case where the process proceeds to step S43, the reconnection control unit 18b sends a call (Call SA) to the LTE control unit 26c of the LTE measuring instrument 25, subsequently performs the LTE call status confirmation process at predetermined time intervals, and repeatedly performs the processes within the set number of reconnection executions until a fact that the LTE call status indicates the communicable state is confirmed.

On the other hand, in a case where the process proceeds to step S45, the reconnection control unit 18b accesses the control unit 21c of the NR system simulator 20 and performs a call status process. After executing the call status process, the reconnection control unit 18b performs an NR call status confirmation process at predetermined time intervals, and repeatedly performs the processes within the set number of reconnection executions until a fact that the NR call status indicates the communicable state is confirmed.

Further, in a case where LTE reconnection is confirmed in step S43 or NR reconnection is confirmed in step S45, the reconnection control unit 18b exits the reconnection process in step S40 (step S50) and continues the process subsequent to step S10 in FIG. 7.

According to a series of measurement control operation matched with the total spherical scanning of the DUT 100 shown in FIG. 7, even in a case where the call connection is disconnected during the measurement of the item, such as EIRP-CDF, EIS-CDF, or TRP, of the DUT 100 using the NR system simulator 20 and the LTE measuring instrument 25, reconnection is immediately performed, so that it is possible to obtain accurate measurement data even in a subsequent measurement position and, as a result, it is possible to perform accurate measurement of each item. Since the measurement of the DUT 100 is performed using the NR system simulator 20 and the LTE measuring instrument 25, it is possible to support the measurement in a non-standalone NR operation.

As described above, the measuring device 1 according to the present embodiment includes a DUT scanning mechanism 56 that is provided in an internal space 51 of an OTA chamber 50 and performs scanning to rotate a DUT 100 which having an antenna 110 so as to sequentially face all preset orientations of a spherical coordinate system by using a center of the spherical coordinate system as a reference point; an NR system simulator 20 that is connected to a test antenna 5 in the internal space 51; an integrated control device 10 that controls the NR system simulator 20 to measure a specific measurement item related to a radio signal in a frequency band, which is used by the antenna 110, by performing a measurement operation, a predetermined number of times, of transmitting a test signal from the test antenna 5 to the DUT 100, and receiving a signal under measurement transmitted from the antenna 110 of the DUT 100 which has received the test signal by the test antenna 5 at a measurement position where the DUT 100 faces a desired orientation, a disconnection detection unit 18a that detects disconnection of call connection during measurement at the measurement position; a reconnection control unit 18b that performs reconnection of the call connection in a case where the disconnection of the call connection is detected by the disconnection detection unit 18a; and a measurement return control unit 18c that returns to measurement of the measurement item from a measurement position subsequent to the measurement position where the call connection is disconnected after the reconnection of the call connection.

Further, the mobile terminal measuring method according to the present embodiment is a mobile terminal testing method for testing a DUT 100 using a measuring device 1 including a DUT scanning mechanism 56 that is provided in an internal space 51 of an OTA chamber 50 and performs scanning to rotate a DUT 100 having an antenna 110 so as to sequentially face all preset orientations of a spherical coordinate system by using a center of the spherical coordinate system as a reference point, and a NR system simulator 20 that is connected to a test antenna 5, the mobile terminal testing method including: a measurement control step (S1, S2) of controlling the NR system simulator 20 to measure a specific measurement item related to a radio signal in a frequency band, which is used by the antenna 110, by performing a measurement operation, a predetermined number of times, of transmitting a test signal from the test antenna to the DUT 100, and receiving a signal under measurement transmitted from the antenna 110 of the DUT 100 which has received the test signal by the test antenna at a measurement position where the DUT 100 faces a desired orientation; a disconnection detection step (S3, S5) of detecting disconnection of call connection during measurement at the measurement position; a reconnection control step (S8, S9) of performing reconnection of the all connection in a case where the disconnection of the call connection is detected in the disconnection detection step; and a measurement return control step (S13, S2) of returning to the measurement of the measurement item from a measurement position subsequent to the measurement position where the call connection is disconnected after the reconnection of the call connection.

With the configuration, in the present embodiment, it is possible to return to each remaining measurement at the measurement position by performing the reconnection of the call connection even in a case where the call connection is disconnected during a regulated number of measurements at the measurement position where the DUT 100 faces the desired orientation, and measurement data is not lost after the call connection is disconnected, so that it is possible to measure a predetermined measurement item with high accuracy at the measurement position, in addition to the measurement data obtained before the call connection is disconnected.

Further, in the measuring device 1 according to the present embodiment has a configuration in which the integrated control device 10 measures an equivalent isotropic radiated power (EIRP) cumulative distribution function or an EIS cumulative distribution number for all the orientations based on the signal under measurement received by the test antenna 5, and measures a total radiated power (TRP) which is a total sum of the EIRP in all the orientations.

With the configuration, in the measuring device 1 according to the present embodiment, it is possible to measure TRP with high accuracy in addition to EIRP-Cumulative Distribution Function (CDF) and EIS-CDF as the measurement item.

Further, in the measuring device 1 according to the present embodiment, in a case where the disconnection of the call connection is detected during the TRP measurement, the integrated control device 10 may perform beam lock control for performing beam locking on an output light (beam) of the DUT 100 in a state of having a peak in a specific beam direction by returning to the measurement position where the disconnection of the call connection is detected after the reconnection of the call connection and before the measurement of the measurement item is started from the measurement position subsequent to the measurement position where the disconnection of the call connection is detected.

With the configuration, in the measuring device 1 according to the present embodiment, even in a case where the disconnection of the call connection occurs during the TRP measurement, it is possible to maintain a beam-locked state in a beam peak direction, which is indispensable for the TRP measurement in a case of returning to the measurement of the remaining measurement points from the measurement point where the disconnection of the call connection, so that the measurement accuracy of the entire TRP does not deteriorate.

Further, the measuring device 1 according to the present embodiment is configured to include the LTE measuring instrument 25 corresponding to an LTE communication standard in addition to the NR system simulator 20 corresponding to an NR communication standard, and detection of the disconnection of the call connection, reconnection of the call connection, and measurement of the specific measurement item are performed in conformity with each of the NR and LTE communication standards.

With the configuration, the measuring device 1 according to the present embodiment can be applied to a test of the DUT 100 in which each base station of NR and LTE is simulated, and can measure the measurement item, such as EIRP-CDF, EIS-CDF or TRP, with high accuracy in a non-stand-alone NR operation stage.

INDUSTRIAL APPLICABILITY

As described above, the mobile terminal testing device and the mobile terminal testing method according to the present invention have an advantage of enabling accurate measurement without data loss due to call disconnection during the measurement for an item on which the measurement is performed while changing an angle of a mobile terminal under an OTA environment, thereby being useful for a mobile terminal testing device and a mobile terminal testing method for performing measurement of EIRP-CDF, EIS-CDF or TRP of the mobile terminal, such as a non-stand-alone NR wireless terminal or a 5G wireless terminal, that has a high-speed communication capability.

DESCRIPTION OF REFERENCE NUMERALS AND SIGNS

1: Measuring device (mobile terminal testing device)
5: Test antenna
6a, 6b: LTE test antenna (test antenna)
10: Integrated control device (measurement control means)
16: DUT scanning control unit (scanning means)
18a: Disconnection detection unit (disconnection detection means)
18b: Reconnection control unit (reconnection control means)
18c: Measurement return control unit (measurement return control means)
20: NR system simulator (measuring device, NR measuring device)
25: LTE measuring instrument (measuring device, LTE measuring device)
50: OTA chamber (radio anechoic box)
51: Internal space
56: DUT scanning mechanism (biaxial positioner, scanning means)
100: DUT (device under test)
110: Antenna of DUT (antenna under test)

What is claimed is:

1. A mobile terminal testing device comprising:
scanning means for performing scanning to rotate a mobile terminal, which is a device under test having an antenna under test, so as to sequentially face all preset orientations of a spherical coordinate system by using a center of the spherical coordinate system as a reference point;
a measuring device that is connected to a test antenna;
measurement control means for controlling the measuring device to measure a specific measurement item related to a radio signal in a frequency band, which is used by the antenna under test, by performing a measurement operation, a predetermined number of times, of transmitting a test signal from the test antenna to the mobile terminal, and receiving a signal under measurement transmitted from the antenna under test of the mobile terminal which has received the test signal by the test antenna at a measurement position where the mobile terminal faces a desired orientation;
disconnection detection means for detecting disconnection of call connection during measurement at the measurement position;

reconnection control means for performing reconnection of the call connection in a case where the disconnection of the call connection is detected by the disconnection detection means; and measurement return control means for returning to measurement of the measurement item from a measurement position subsequent to the measurement position where the call connection is disconnected after the reconnection of the call connection.

2. The mobile terminal testing device according to claim 1, wherein the measurement control means measures an equivalent isotropic radiated power (EIRP) cumulative distribution function or an EIS cumulative distribution number for all the orientations based on the signal under measurement received by the test antenna, and measures a total radiated power (TRP) which is a total sum of the EIRP in all the orientations.

3. The mobile terminal testing device according to claim 2, wherein in a case where the disconnection of the call connection is detected during TRP measurement is performed, the measurement control means performs beam lock control for performing beam locking on a beam of the device under test by returning to the measurement position where the disconnection of the call connection is detected after the reconnection of the call connection and before the measurement of the measurement item is started from the measurement position subsequent to the measurement position where the disconnection of the call connection is detected.

4. The mobile terminal testing device according to claim 1, wherein the measuring device includes an NR measuring device corresponding to an NR communication standard, and an LTE measuring device corresponding to an LTE communication standard, and the detection of the disconnection of the call connection, the reconnection of the call connection, and the measurement of the specific measurement item are performed in accordance with each of the NR and LTE communication standards.

5. The mobile terminal testing device according to claim 1, further comprising:

a radio anechoic box including an internal space, wherein the scanning means and the test antenna are provided in the internal space.

6. A mobile terminal testing method for testing a device under test using a mobile terminal testing device including scanning means for performing scanning to rotate a mobile terminal having an antenna under test so as to sequentially face all preset orientations of a spherical coordinate system by using a center of the spherical coordinate system as a reference point, and a measuring device that is connected to a test antenna, the mobile terminal testing method comprising:

a measurement control step of controlling the measuring device to measure a specific measurement item related to a radio signal in a frequency band, which is used by the antenna under test, by performing a measurement operation, a predetermined number of times, of transmitting a test signal from the test antenna to the mobile terminal, and receiving a signal under measurement transmitted from the antenna under test of the mobile terminal which has received the test signal by the test antenna at a measurement position where the mobile terminal faces a desired orientation;

a disconnection detection step of detecting disconnection of call connection during measurement at the measurement position;

a reconnection control step of performing reconnection of the call connection in a case where the disconnection of the call connection is detected in the disconnection detection step; and a measurement return control step of returning to the measurement of the measurement item from a measurement position subsequent to the measurement position where the call connection is disconnected after the reconnection of the call connection.

* * * * *